United States Patent
Marchuk et al.

(10) Patent No.: US 11,818,186 B2
(45) Date of Patent: Nov. 14, 2023

(54) DISTRIBUTED NETWORK RECORDING SYSTEM WITH SYNCHRONOUS MULTI-ACTOR RECORDING

(71) Applicant: DELUXE MEDIA INC., Burbank, CA (US)

(72) Inventors: Andriy Marchuk, Santa Monica, CA (US); Gregory J. Taieb, Los Angeles, CA (US); Igor Skakovskyi, Los Angeles, CA (US); Stefan Lazarevic, Belgrade (RS); Nasik Shafeek, Kandy (LK)

(73) Assignee: DELUXE MEDIA INC., Burbank, CA (US)

( * ) Notice: Subject to any disclaimer, the term of this patent is extended or adjusted under 35 U.S.C. 154(b) by 0 days.

(21) Appl. No.: 17/327,440

(22) Filed: May 21, 2021

(65) Prior Publication Data
US 2022/0377121 A1    Nov. 24, 2022

(51) Int. Cl.
*H04L 65/60* (2022.01)
(52) U.S. Cl.
CPC .................................. *H04L 65/60* (2013.01)
(58) Field of Classification Search
CPC ...................................................... H04L 65/60
See application file for complete search history.

(56) References Cited

U.S. PATENT DOCUMENTS

| | | | |
|---|---|---|---|
| 10,388,273 B2* | 8/2019 | Garner | G10L 15/08 |
| 2006/0274166 A1 | 12/2006 | Lee et al. | |
| 2008/0092047 A1 | 4/2008 | Fealkoff et al. | |
| 2010/0260482 A1 | 10/2010 | Zoor | |
| 2011/0211524 A1 | 9/2011 | Holmes et al. | |
| 2012/0041759 A1 | 2/2012 | Barker et al. | |
| 2012/0246257 A1 | 9/2012 | Brown | |
| 2015/0256613 A1* | 9/2015 | Walker | H04L 43/10 709/217 |
| 2015/0296247 A1 | 10/2015 | Glasser | |
| 2016/0182855 A1 | 6/2016 | Caligor et al. | |
| 2018/0047386 A1* | 2/2018 | Garner | G10L 15/22 |
| 2018/0181730 A1 | 6/2018 | Lyske | |
| 2019/0373306 A1 | 12/2019 | Yao | |
| 2020/0228856 A1* | 7/2020 | Rivera | G07F 17/16 |
| 2022/0239269 A1 | 7/2022 | Min et al. | |

* cited by examiner

*Primary Examiner* — Suraj M Joshi
*Assistant Examiner* — Jaren Means
(74) *Attorney, Agent, or Firm* — Dorsey & Whitney LLP

(57) ABSTRACT

A system and method for generating a compilation audio clip is disclosed. The method may include providing access to a master recording session to a first device corresponding to a first user and a second device corresponding to a second user, where the first device and the second device are in different physical locations, initiating a playback of a video content at the first and at the second device, actuating a first microphone coupled to the first device to record a first audio clip, where the actuation is synchronized to the playback of the video content, actuating a second microphone coupled to the second device to record a second audio clip, where the actuation is synchronized to the playback of the video content, receiving the first audio clip from the first device and the second audio clip from the second device, and generating a compilation audio clip including audio from the first audio clip and audio from the second audio clip, where the compilation audio clip is synchronized to the video content.

21 Claims, 6 Drawing Sheets

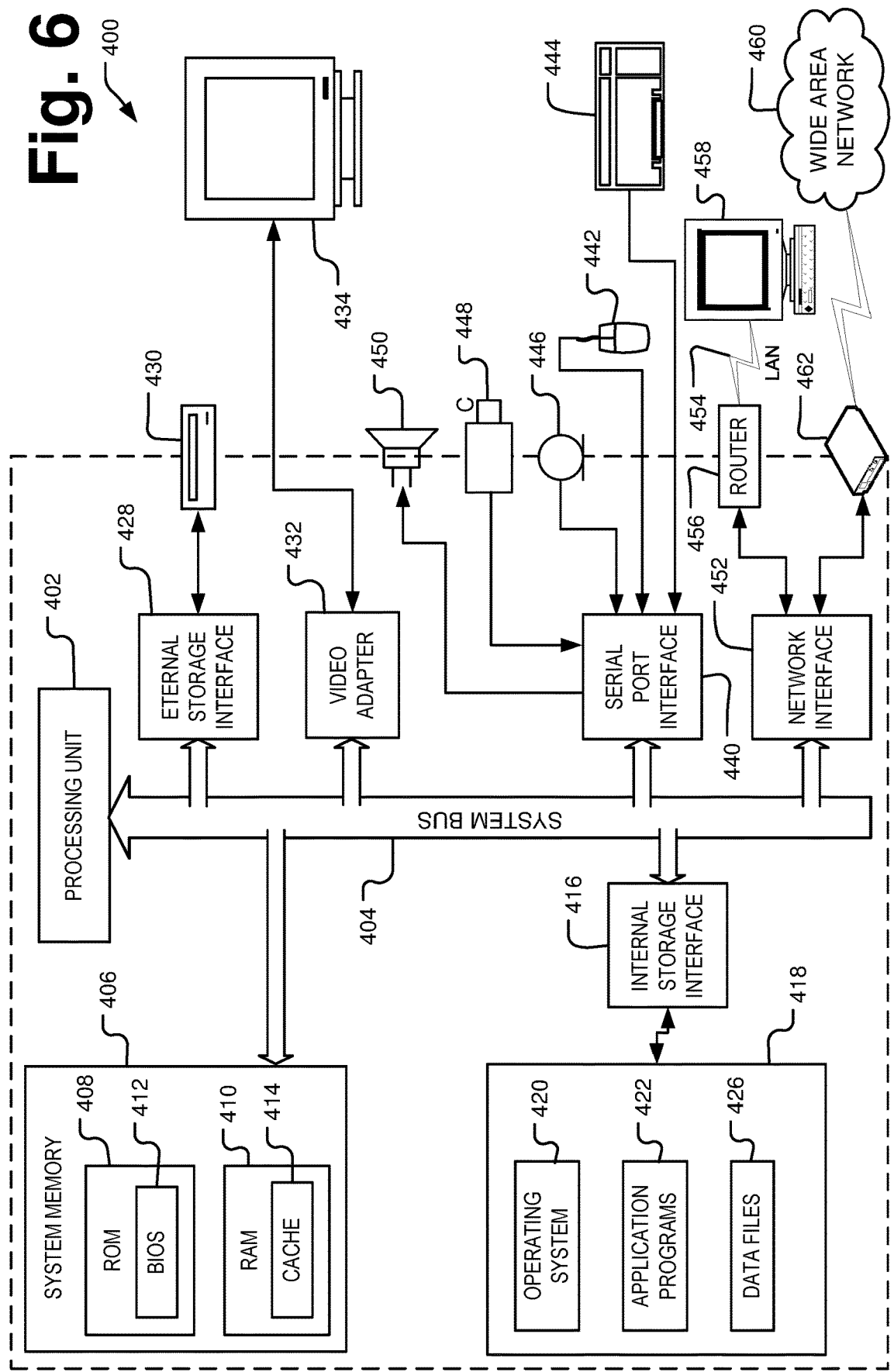

DISTRIBUTED NETWORK RECORDING SYSTEM WITH SYNCHRONOUS MULTI-ACTOR RECORDING

CROSS REFERENCE TO RELATED APPLICATIONS

This application is related to U.S. patent application Ser. No. 17/327,373, filed 21 May 2021 entitled "Distributed network recording system with true audio to video frame synchronization", U.S. patent application Ser. No. 17/327,467, filed 21 May 2021 entitled "Distributed network recording system with single user control," and U.S. patent application Ser. No. 17/327,540, filed 21 May 2021 entitled "Distributed network recording system with multi-user audio manipulation and editing," each of which is hereby incorporated by reference herein in its entirety for all purposes.

FIELD

The described embodiments relate generally to systems and methods to capture and edit audio for use with video content.

BACKGROUND

Audio recording sessions are carried out to digitally record voice-artists for a number of purposes including, but not limited to, foreign language dubbing, voice-overs, automated dialog replacement, or descriptive audio for the visually impaired. Recording sessions are attended by the actors/performers, one or more engineers, other production staff, and producers and directors. The performer watches video playback of the program material and reads the dialog from a script. The audio is recorded in synchronization with the video playback to replace or augment the existing program audio. Such recording sessions typically take place in a dedicated recording studio. Participants all physically gather in the same place. Playback and monitoring is then under the control of the engineer. In the studio, the audio recording is of broadcast or theater technical quality. The recorded audio is also synchronized with the video playback as it is recorded and the audio timeline is captured and provided to the engineer for review and editing.

The information included in this Background section of the specification, including any references cited herein and any description or discussion thereof, is included for technical reference purposes only and is not to be regarded subject matter by which the scope of the invention as defined in the claims is to be bound.

SUMMARY

The systems and methods described in the present disclosure enable remote voice recording synchronized to video using a cloud-based virtual recording studio within a web browser to record and review audio while viewing the associated video playback and script. All assets are accessed through or streamed within the browser application, thereby eliminating the need for the participants to install any applications or store content locally for later transmission. Recording controls, playback/record status, audio channel configuration, volume, audio timeline, script edits, and other functions are synchronized across participants and may be controlled for all participants remotely by a designated user, typically a sound engineer, so that each participant sees and hears the section of the program being recorded and edited at the same time.

In a first aspect, a method for generating a compilation audio clip is disclosed. The method may include providing access to a master recording session to a first device corresponding to a first user and a second device corresponding to a second user, where the first device and the second device are in different physical locations, initiating a playback of a video content at the first and at the second device, actuating a first microphone coupled to the first device to record a first audio clip, where the actuation is synchronized to the playback of the video content, actuating a second microphone coupled to the second device to record a second audio clip, where the actuation is synchronized to the playback of the video content, receiving the first audio clip from the first device and the second audio clip from the second device, and generating a compilation audio clip including audio from the first audio clip and audio from the second audio clip, where the compilation audio clip is synchronized to the video content.

In a second aspect, a system for generating compilation audio clips is disclosed. The system may include a database for storing audio clips and a processing element associated with the database. The processing element may be configured to transmit a video content to a first user device and a second user device, initiate a first local audio recording at the first device and a second local audio recording at the second user device based on the transmission of the video content to the first user device and the second user device, terminate the first local audio recording and the second local audio recording, receive the first local audio recording from the first user device and the second local audio recording from the second user device, store the first local audio recording at a first location within the database and the second local audio recording at a second location within the database, and generate a compilation audio clip including audio from the first local audio recording and audio from the second local audio recording, where the compilation audio clip is synchronized to the video content based on the information stored with the first local audio recording and information stored with the second local audio recording.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The disclosure will be readily understood by the following detailed description in conjunction with the accompanying drawings, wherein like reference numerals designate like structural elements.

FIG. 3 is an example of a user interface for interacting with a master recording session.

FIG. 6 is a schematic diagram of a computer system that may be either a server computer or a client computer configured for implementing aspects of the recording system disclosed herein.

DETAILED DESCRIPTION

Figure 1:
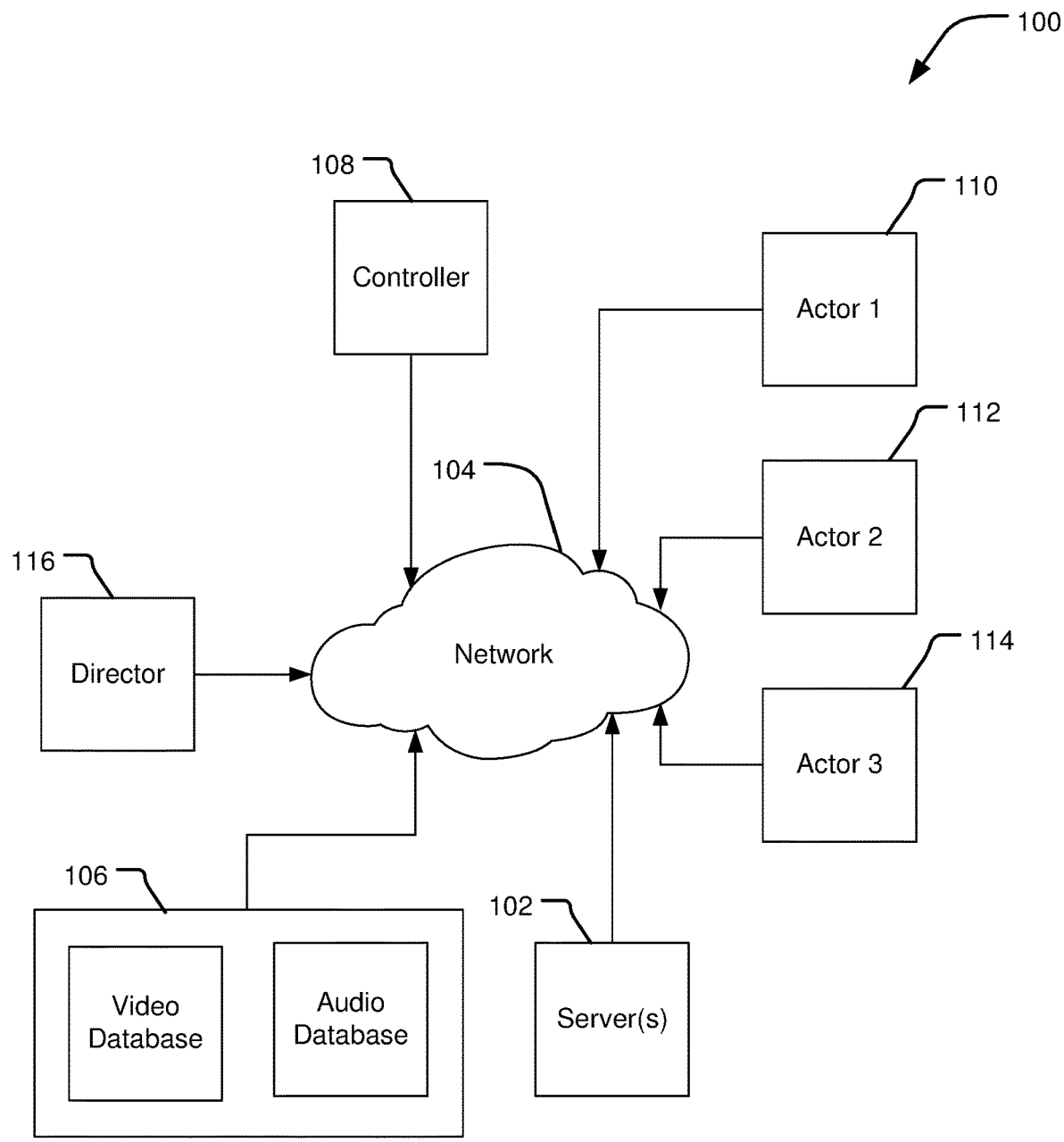
FIG. 1 is a schematic diagram of an embodiment of a system for conducting a remote audio recording session synchronized with video.

In the post-production process of film and video creation, the raw film footage, audio, visual effects, audio effects, background music, environmental sound, etc. are cut, assembled, overlayed, color-corrected, adjusted for sound level, and subjected to numerous other processes in order to complete a finished film, television show, video, or other audio-visual creation. As part of this process, a completed film may be dubbed into any number of foreign languages from the original language used by actors in the film. Often a distributed workforce of foreign freelance translators and actors are used for foreign language dubbing. In such scenarios, the translators and foreign language voice actors are often access video and audio files and technical specifications for a project through a web-based application that streams the video to these performers for reasons of security, e.g., to prevent unauthorized copies of the film to be made. The foreign language actors record their voice performances through the web-based application. Often these recordings are performed without supervision by a director or audio engineer. Further, the recording quality through web-based browser applications is not of industry standard quality because the browser applications downsample and compress the recorded audio for transmission to a secure server collecting the voice file.

Other post-production audio recording needs arise when the original audio recording is faulty for some reason. For example, unwanted environmental noises (e.g., a car alarm) were picked up by the microphone during an actor's performance, sound levels were too low (or too high), the director ultimately did not like the performance by the actor in a scene, etc. Bringing actors, directors, audio engineers, and others back together in post production to a studio to fix audio takes in scenes is expensive and time consuming. However, it is usually the only way to achieve a full, high-resolution audio recording. Similar to the issues with foreign language audio dubbing described above, attempts to record remotely over a network have been performed with lossy compression files, such as Opus, to allow for low latency in transmission in an attempt to achieve approximate synchronization with the corresponding video frames. However, bandwidth and hardware differences can cause a greater delay due to buffering for one actor but not for another such that the dialog each records is not in synch with the other. There is always some lag due to the network bandwidth limitations on either end as well as encoding, decoding, and compressing the audio files. Thus, synchronization is generally not achieved and an audio engineer must spend significant time and effort to properly synchronize the audio recordings to the video frames. Also, sound captured and transmitted by streaming technologies is compressed and lossy; it cannot be rendered in full high-resolution, broadcast or theater quality and is subject to further quality degradation if manipulated later in the post production process. Further, if a director is involved in managing the actor during the audio dubbing process, there is usually a discrepancy between the streaming video playback viewed by the director and the streaming sound file received from the actor. The audio is out of synch with the video and the director is unable to determine whether the audio take synchronizes with the lip movement of the actor in the film content and whether another take is necessary.

The distributed network recording system disclosed herein addresses these problems and provides true synchronization between the audio recorded by the actor and the frames of a portion of the film content being dubbed. The system provides for the frame-synchronized recording of lossless audio files in full 48 kHz/24 bit sound quality, which is the film industry standard for high-resolution recorded audio files. As described in greater detail herein, the system controls a browser application on an actor's computer to record and cache a time-stamped, frame-synchronized, lossless, audio file locally and then upload the lossless audio file to a central server. The system further allows for immediate, in-session review of the synchronized audio and video among all session participants to determine whether a take is accurate and acceptable or whether additional audio recording takes are necessary. This functionality is provided by sending a compressed, time-stamped proxy audio file of the original lossless recording to each user device participating in the recording session, e.g., an audio engineer, multiple actors, a director, etc. The proxy audio file can be reviewed, edited, and manipulated by the participants in the recording session and final time synchronized edit information can be saved and associated with the original, lossless audio file to script the final audio edit for the dubbed film content. Additional detailed description of this process is provided further herein.

Utilizing exemplary methods described herein, the system can be configured to allow capture of the audio performance for two or more actors for a particular video content. This allows audio content or tracks to be recorded for actors with simultaneous dialogue (e.g., talking over one another), as well as capture audio content for multiple actors that may each have dialogue during a sequence of video frames for the video content. Conventional techniques required that all actors be present in a recording studio, i.e., in the same physical location, to record audio for the same video content at the same time. Specifically, remote options experience lag between different audio contributions from the actors and/or video content and are configured to record a single audio clip for all actors, which may be offset or unsynchronized from the video content, as well as difficult to edit with respect to a single actor.

The system may allow two or more actors to have access to a master recording session, such as by logging into a webpage from their respective devices (e.g., computers, smartphones, etc.) in their separate locations. A user-designated controller, such as a sound engineer, may initiate playback of the video content, such as a video clip, where the video content is played via the webpage and presented on a first device for the first actor and a second device for the second actor. At a desired time, such as when a video frame including a first actor dialogue is approaching, the controller can instruct the first actor device to actuate a local microphone. Similarly, the controller can instruct the second actor device to actuate a local microphone, which may be actuated contemporaneously with or at a separate time from the first actor device. In both cases, the actuation of the two microphones is synchronized with or otherwise tied to the frames of the video content. For example, the system, may record metadata including a time stamp with respect to the video content as to when (e.g., at which frame) the microphones were actuated, with the time stamp corresponding to a master timeline of the video content. The same applies for additional actors logging in from additional devices.

With the microphones actuated, the two actors perform the audio contributions in response to viewing the video content and the actor's devices record the respective audio contributions (e.g., dialogue) as local audio clips, e.g., audio content or audio files. For example, the first device records a first audio clip corresponding to the first actor's dialogue and the second device records a second audio clip corresponding to the second actor's dialogue. In some embodiments, the first and second actors may listen to each other's performance via headphones via the web session or other platform (e.g., separate web conferencing tool or phone connection), such that the microphones capture the dialogue of only the respective actor locally, rather than other sounds from the others in the session. In this manner, the stored audio content on the first device includes only dialogue from the first actor and the stored audio content on the second device includes only dialogue from the second actor. Thus, audio is recorded at only within the participants' respective environments, such as the first actor's physical location and the second actor's physical location, without being contaminated by audio from the other actors and/or other participants in the master session.

The audio clips stored on the first device and the second device may then be transmitted to a server and/or storage location. For example, the audio clips may be transmitted in one or more segments to a server, where the transmission may occur during recording and/or after the recording is terminated. In many embodiments, the audio clips are deleted after transfer and/or encrypted to prevent access to the tracks by the first actor or the second user. This helps to ensure that the audio clips are not improperly released by an unauthorized party and helps to maintain control over the content. Time stamp information and other data corresponding to the video content and actuation timing may be stored in conjunction with the recorded audio clips and transmitted to the server with the respective segments and/or audio clips. The time stamp information allows the audio clips to be synchronized to the video content as it plays on the user device, rather than the timing of a command to initiate video playback transmitted from the controller.

The system may automatically collect the individual audio recordings and place them onto the appropriate audio clips that can be allocated to individual actor devices, and the audio is synchronized to the video content. Because the audio content files are recorded separately from one another, they can be edited separately. For example, editing of noise in the first audio file will not unnecessarily impact the recording of the second actor in the second audio file.

An exemplary distributed network recording system 100 for capturing high-quality audio from one or more remotely located actors is depicted in FIG. 1. The system 100 is controlled by a server 102 that initiates a master recording session. The server 102 also acts as a communication clearinghouse for the communication network 104, e.g., the Internet "cloud," between devices of the various participants in the master recording session. The server 102 may be a single device that directly manages communications with the participant devices or it may be a collection of distributed server devices that work in cooperation with each other to enhance speed of delivery of data, e.g., primarily video/audio files to each of the participant devices. For example, the server 102 may comprise a host server that manages service to and configuration of a web browser interface for each of the participant devices. Alternatively, the computer server 102 may be in the form of a scalable cloud hosting service. In addition, the server 102 may include a group of geographically distributed servers forming a content delivery network (CDN) that may store a copy of the video files used in the master recording session. Geographic distribution of the video files allows for lower time latency in the streaming of video files to participant devices.

The server 102 is also connected to one or more storage devices 106 that provides file storage capacity for recorded audio files, proxy audio files, metadata collected during a recording session, a master digital video file of the video content, application software objects and/or modules used by the server 102 to instantiate and conduct the master recording session, and/or other data and media files that may be used in a recording session. As with the server 102, the storage 106 may be a singular device or multiple storage devices that are geographically distributed, e.g., as components of a CDN. In some examples, the storage device 106 may include an audio database and a video database, which are configured to storage audio and video data, respectively. The audio and video databases may form separate areas of the same device and/or be hosted on different devices.

A number of participant or user devices may be in communication with the server 102 to communicate with each other and participate in the master recording session. For example, the user devices may connect with the server over the Internet through a browser application by accessing a particular uniform resource locator (URL) generated to identify the master recording session. The number of devices, as well as the permissions assigned to each of the devices will vary depending on the number of actors, roles, and the like. As such, the discussion of any particular number and type of device role is meant as illustrative only.

A controller user device 108 or controller 108 may be a personal computer or other computing device (e.g., tablet, smartphone, etc.) at a remote location associated with an audio engineer or master session controller. The audio engineer or other user may be provided with credentials or other access control permissions to primarily control the master recording session, which may allow the controller 108 to initiate playback, for example, on the user devices as part of the master recording session. A first user device 110 may be a personal computer at a remote location associated with a first actor to be recorded as part of the master recording session. A second user device 112 may be a personal computer at a remote location associated with a second actor to be recorded as part of the master recording session. A third user device 114 may be a personal computer at a remote location associated with a third actor to be recorded as part of the master recording session. A fourth or director user device 116 may be a personal computer at a remote location associated with a director of the film reviewing the audio recordings made by the actors and determining acceptability of performances during the master recording session.

In many embodiments, the user devices 108, 110, 112, 114, 116 may include a microphone or other audio capturing device, as well as local storage (e.g., memory), and be in communication with a display. Specific features of the user devices are discussed in more detail with respect to FIG. 6. The microphone for the various devices allows the actors to speak in their local environment (e.g., physical location) and the sounds to be captured or recorded by the user device. Similarly, the storage allows the user device to save the audio files so that they can be transmitted to the server 102 and/or storage device 106.

The various user devices 108, 110, 112, 114, 116 communicate with the server 102, which transmits control information to the user devices 108, 110, 112, 114, 116 during the master recording session. Likewise, each of the user devices 108, 110, 112, 114, 116 may transmit information to the server 102, e.g., control requests or query responses, which may then forward related instructions to one or more of the user devices 108, 110, 112, 114, 116 (e.g., the user devices 108, 110, 112, 114, 116 may be individually addressable and/or collectively addressable). Session data received from any of the user devices 108, 110, 112, 114, 116 received by the server 102 may be passed to one or more storage devices 106. Additionally, the user devices 108, 110, 112, 114, 116 may receive files directly from the storage device 106 or transmit files directly to the storage device 106, for example, if the storage device 106 is a group of devices in a CDN. For example, the storage device 106 in a CDN configuration may directly stream the video film clips being dubbed or proxy audio files as further described herein to the user devices 108, 110, 112, 114, 116 to reduce potential latency in widely geographically distributed user devices 108-116. Similarly, the user devices 108, 110, 112, 114, 116 may upload audio files created locally during the master recording session directly to the storage device 106, e.g., in a CDN configuration at the direction of the computer server 102.

In one embodiment, the controller 108 may begin a master recording session2, such as assigning a particular video content (e.g., movie, video clip, or the like) from storage 106 to be used with the audio to be captured. The controller 108 may also determine or retrieve other information to be used with the master recording sessions, e.g., dialogue prompts, actor information, and the like.

Once the master recording session is activated, the user devices 110, 112, 114, 116 can access the master recording session. For example, the user devices 110, 112, 114, 116 may navigate to a URL via a web browser, where the URL points to the location on the server 102 for the master recording session virtual environment. In some embodiments, the users may be prompted to enter credentials (e.g., login information) to access the master recording session. Once accessed, the user devices 108, 110, 112, 114, 116 will present a user interface corresponding to the master recording session and optionally personalized to the particular user roles (e.g., actor, director, controller). For example, the actor user interface may include a location for dialogue prompts for dialogue assigned to that actor, whereas the director interface may include icons or other features specific to the director role.

The controller 108 may then initiate playback for the video content. As this occurs, the various user devices 110, 112, 114, 116 may begin playback of the video content as it is streamed or otherwise transmitted via the network 104 from the storage 106 and/or server 102. It should be noted that due to bandwidth issues, distance, device characteristics, or the like, the playback of the video content may begin at different times, e.g., a first user device may begin playback at 8:00:00 am Pacific Time and a second user device may begin playback at 8:00:03 am Pacific Time due to the second user having a slower, lagging communication connection. In other instances, the playback may occur simultaneously or substantially simultaneously. As will be discussed in more detail below, despite the differences in actual playback times, audio that may be recorded with respect to the video content may be synchronized to a standard time (e.g., a master timeline for the video content).

In some instances, the video content playback may not include audio, in other embodiments, the playback may include a playback audio track, which may include music, environmental noises, dialogue, or the like. In some instances, the master session may also include audio that may be separate from the video content, e.g., audio from the controller 108 and/or other user devices 110, 112, 114 may be transmitted via the master session. In other instances, the audio and/or video (e.g., camera images) may be transmitted in a separate session or platform (e.g., video conferencing platform or telephone) that may be operated in conjunction with the master recording session.

During playback of the video content, the controller 108 may selectively activate microphones on the various user devices 110, 112, 114. In instances where the playback of the video content may also include audio, the controller 108 may selectively deactivate a sound device for the various user devices (e.g., speakers) or other audio output in order to prevent contamination of the recording. Alternatively or additionally, the audio output for the user devices may be configured to reduce the audio being received at the local microphones, e.g., the audio output devices may be headphones.

The controller 108 may activate a microphone for a particular actor based on the actor having an audio contribution, e.g., dialogue, coming up or at a particular frame. Once activated and at the appropriate time or video frame, the actor may produce the audio contribution, e.g., speak dialogue. The audio is captured locally by the user device 110. At the same time and/or at other times during the video content playback, the other actors may also generate their respective audio contributions, which may be captured locally on the other user devices 112, 114. The user devices 110, 112, 114 may store the audio contributions as audio clips and transmit the audio clips or audio files to the storage 106 and/or server 102. In some embodiments, the other actors may be able to hear the contributions in real time (e.g., via the secondary session) or via the master recording session audio playback. In other embodiments, the other actors may not be able to hear other actors and their contributions until a compilation or other playback is generated. The audio clips may be stored in a manner that prevents access by the users, e.g., may be encrypted and optionally may be stored such that they may be deleted after a predetermined time period or event. In one embodiment, the audio clips may be stored in a cache corresponding to the browser and the cache may be deleted upon closing of the master recording session tab or browser window.

The audio clips may be transmitted during recordation, e.g., at discrete intervals, and/or after the audio contribution or video playback has ended. In some embodiments, the controller 108 can instruct commands to the user devices 110, 112, 114 to upload the audio clips.

The audio files may be transmitted from the various user devices 110, 112, 114 and placed in storage. The audio files may include timestamp or other metadata that may provide synchronization information to synchronize the audio files back to a particular time of the video content. For example, the audio files may include an activation time when the controller 108 activated the microphone, where the time may be relevant to the local playback time of the video content, e.g., frame position, rather than the actual playback time of the master session video playback.

After capture, the audio files may be edited, reformatted, or the like within the master session environment. In order to provide this functionality in a real-time environment, the recorded audio files may be transformed at the server computer 102 into proxy files that are compressed, lossy versions of the original audio files. The proxy files can be transmitted to each user device 108, 110, 112, 114, 116 for local use relatively quickly soon (within a few seconds) after a particular recording is complete. Recall that the local user devices 110, 112, 114 of actors involved in recording may not retain copies of the audio files. Further, the audio engineer user device 108 and the director user device 116 never had any of the original audio file recordings. The audio files can be replayed within the master recording session, where the audio files are played synchronized to the video content. Alternatively, the audio files may be played separately from the video content. A playback of the captured audio files may be presented to determine if additional takes should be done. Any editing by the users may be saved as metadata describing the edit information tied to the time stamps. Thus, the edit information can be applied to the original audio files saved on the storage device 106 at a later time during compilation of a master audio file.

Figure 2:
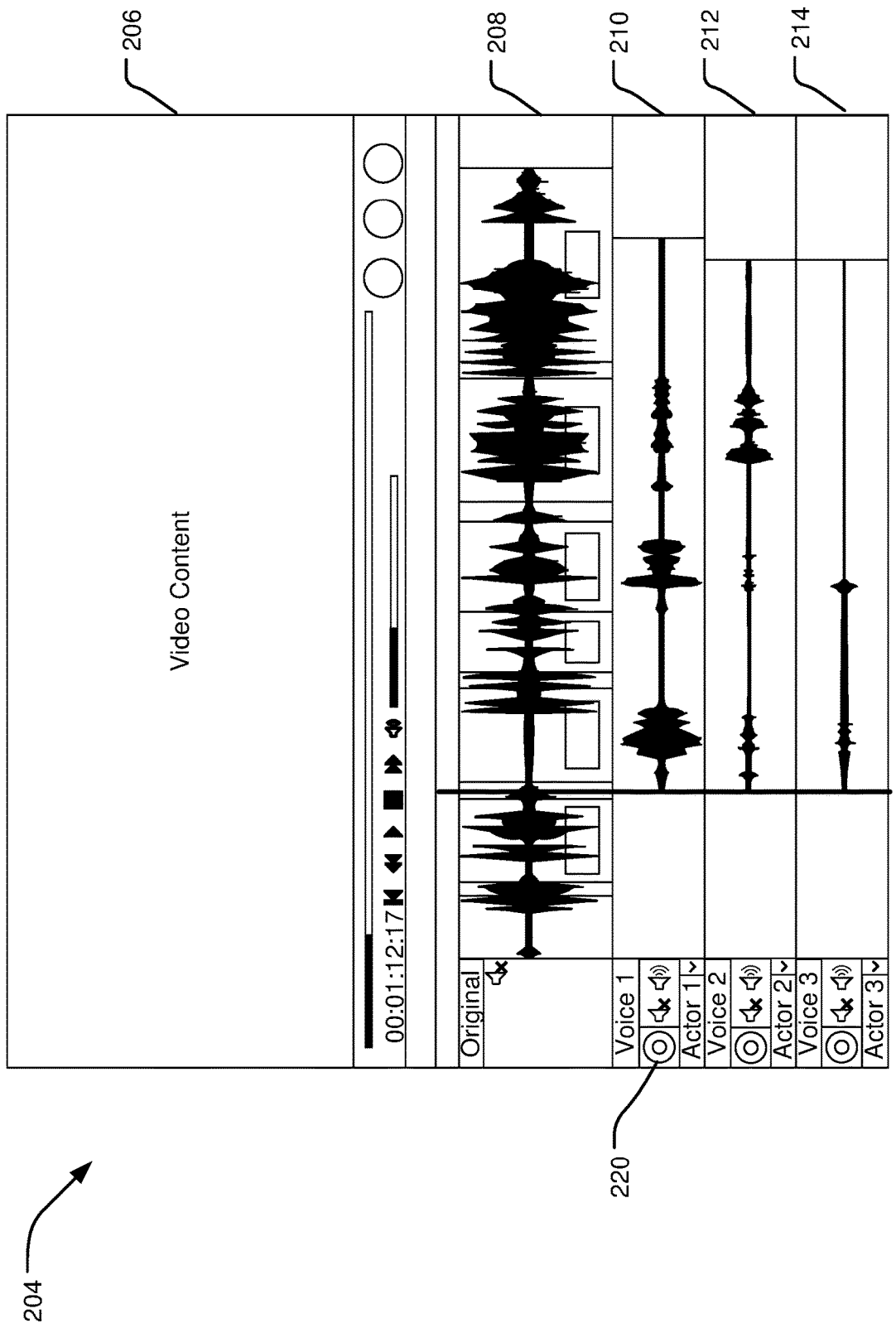

FIG. 2 illustrates an example user interface 204 for the master recording session 202. The user interface may include a video content portion 206 (e.g., media player area) used to present the video content playback on the user device, e.g., the video content plays within the designated video content portion 206 window. The user interface 204 may also include multiple timeline areas, e.g., master timeline 208 and one or more actor timelines 210, 212, 214. The master timeline 208 may illustrate the combination of the actor audio files relative to a playback timeline or synchronized to the video content timeline. In other words, the master timeline 208 includes information regarding the audio files that are to be played at select points in time or frames of the video content. In some instances, there may be two or more audio files configured to play at the same points in time, in other instances, a single audio file may be played, followed by another audio file.

As shown in FIG. 2, the controller 108 may include icons 220 to issue recording commands for the various user devices 110-114. When selected, the recording icons 220 cause the computer device to issue commands to the selected user device to initiate a local recording, e.g., activate a microphone. In some embodiments, the commands may be transmitted to the server 102, which may communicate the commands via a protocol that enables communication between the server and the local devices, such as a browser-supported network protocol (e.g., Websocket, HTTP, or the like). However, in other examples, such as when the master recording session may be provided by an application or other downloadable or locally executed program, the commands may be communicated in other manners.

With continued reference to FIG. 2 the user interface 204 may also include other visual features that allow the controller 108 to control the master recording session, such as begin playback of the video content, stop and start recording for the various user devices, edit the audio playback, and so on.

Figure 3:
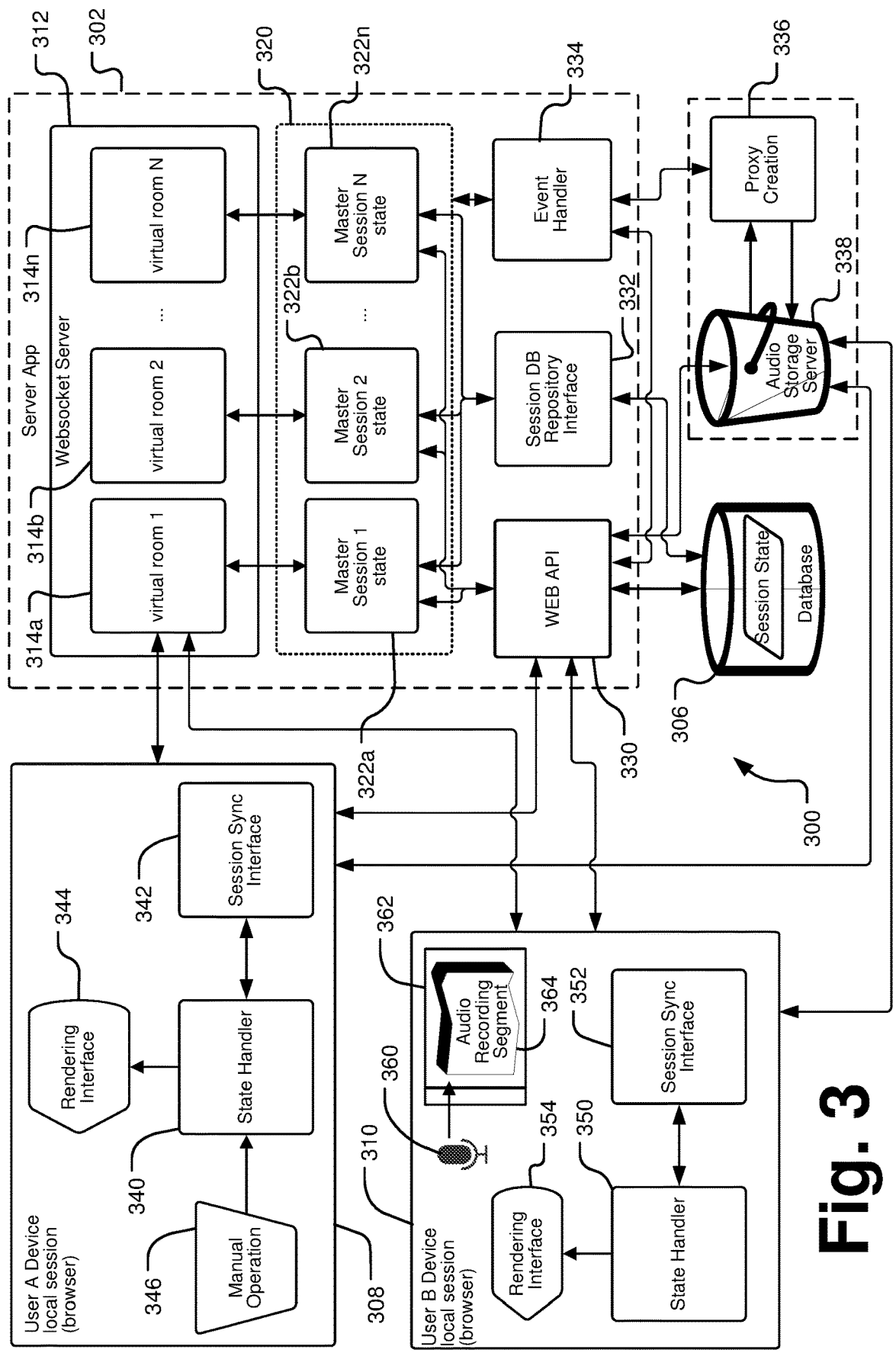
FIG. 3 is a schematic diagram of operations performed by the system of FIG. 1.

An exemplary embodiment of the system and, in particular, a more detailed implementation of a server configuration is presented in FIG. 3. The server computer 302 is indicated generally by the dashed line bounding the components or modules that make up the functionality of the server computer 302. The components or modules comprising the server computer 302 may be instantiated on the same physical device or distributed among several devices which may be geographically distributed for faster network access. In the example of FIG. 3, a first user device 308 and a second user device 310 are connected to the server computer 302 over a network such as the Internet. However, as discussed above with respect to FIG. 1, any number of user devices can connect to a master recording session instantiated on the server computer 302.

The server computer 302 may instantiate a Websocket application 312 or similar transport/control layer application to manage traffic between user devices 308, 310 participating in a master recording session. Each user device 308, 310 may correspondingly instantiate the recording studio environment locally in a web browser application. A session sync interface 342, 352 and a state handler 340, 350 may underly the recording studio environment on each user device 308, 310. The session sync interface 342, 352 communicates with the Websocket application 312 to exchange data and state information. The state handler 340, 350 maintains the state information locally on the user devices 308, 310 both as changed locally and as received from other user devices 308, 310 via the Websocket application 312. The current state of the master recording session is presented to the users via rendering interfaces 344, 354, e.g., as interactive web pages presented by the web browser application. The interactive web pages are updated and reconfigured to reflect any changes in state information received from other user devices 308, 310 as maintained in the state handler 340, 350 for the duration of the master recording session.

The Websocket application 312 may be a particularly configured Transmission Control Protocol (TCP) server environment that listens for data traffic from any user device 308, 310 participating in a particular recording session and passes the change of state information from one user device 308, 310 to the other user devices 308, 310 connected to the session. In this manner, the Websocket application 312 facilitates the abstraction of a single recording studio environment presented within the browser application, i.e., rendering interfaces 344, 354 on each user device 308, 310. Namely, whatever action taken within the rendering interface 344, 354 by one user on a local user device 308, 310 that is coded for replication on all browser interfaces is transmitted to all the other user devices 308, 310 and presented in rendering interfaces 344, 354 thereon.

The server computer 312 may instantiate and manage multiple master recording session states 322a/b/n in a session environment 320 either simultaneously or at different times. If different master recording session states 322a/b/n operate simultaneously, the Websocket application 312 creates respective "virtual rooms" 314a/b/n or separate TCP communication channels for managing the traffic between user devices 308, 310 associated with a respective master recording session state 322a/b/n. Each master recording session state 322a/b/n listens to all traffic passing through the associated virtual room 314a/b/n and captures and maintains any state change that occurs in a particular recording session 322a/b/n. For example, if a user device 308 (e.g., an audio engineer) associated with the first virtual room 314a initiates a manual operation 346, e.g., starts video playback for all user devices 308, 310 associated with the first virtual room 314a and activates a microphone of another one of the users 310 (e.g., an actor), the first master recording session state 322a notes and saves these actions. Similarly, if an audio engineer at a user device 308 edits an audio file, the edits made to the audio file, e.g., in the form of metadata describing the edits (video frame association, length of trim, location of trim in audio recording, loudness adjustments, etc.), are captured by the first master recording session state 322a.

Each master recording session state 322a/b/n communicates with a session state database server 306 via a session database repository interface 332. The session state database server 306 receives and persistently saves all the state information from each master recording session state 322a/b/n. The session state database server 306 may be assigned a session identifier, e.g., a unique sequence of alpha-numeric characters, for reference and lookup in the session state database server 306. In contrast, state information in each master recording session state 322a/b/n persists only for the duration of a recording session. If a recording session ends before all desired dubbing activities are complete, a new master recording session state 322a/b/n can be instantiated later by retrieving the session state information using the previously assigned session identifier. All the prior state information can be loaded into a new master recording session state 322a/b/n and the recording session can pick up where it left off. Further, an audio engineer can open a prior session, either complete or incomplete, in a master recording session state 322a/b/n and use any interface tools to edit the audio outside of a recording session by associating metadata descriptors (e.g., fade in, fade out, trim, equalization, compression, etc.) using a proxy audio file provided locally as further described herein.

The session database repository interface 332 is an application provided within the server computer 312 as an intermediary data handler and format translator, if necessary, for files and data transferred to and from the session state database server 306 within the master recording session state 322a/b/n. Databases can be formatted in any number of ways (e.g., SQL, Oracle, Access, etc.) and session database repository interface 332 is configured to identify the type of database used for the session state database server 332 and arrangement of data fields therein. The session data repository interface 332 can then identify desired data within the session state database server 306 and serve requested data, appropriately transforming the format if necessary, for presentation to participants through the web browser applications on user devices 308, 310. Similarly, as new metadata describing state changes is generated during a master recording session state 322a/b/n, the session database repository interface 332 will arrange and transform the metadata into an appropriate format for storage on the type of database being used as the session state database server 306. In the context of audio dubbing for film and video, the audio data may be saved, for example, in Advanced Authoring Format (AAF), a multimedia Me format for professional video post-production and authoring designed for cross-platform digital media and metadata interchange.

The server computer 312 may also be configured to include a Web application program interface (Web-API) 330. The Web-API 330 may be provided to handle direct requests for action from user devices 308, 310 that do not need to be broadcast to other user devices 308, 310 via the Websocket server 302. For example, the Web API 330 may provide login interface for users and the initial web page HTML code for instantiation of the recording studio environment on each user device 308, 310. In another example, if a user device 308, 310 has recorded a high-resolution audio file, the audio file is not intended to be shared among the participants in a high-resolution form (as further described below). Rather, the high-resolution audio file may be directed for storage by the Web API 330 within a separate audio storage server 338 for access by any audio editing session at any time on any platform. The recording studio environment present on each user device 308, 310 may be configured to direct certain process tasks to the Web API 330 as opposed to the Websocket application 312, which is primarily configured to transmit updates to state information between the user devices 308, 310.

In the case of receipt of notice of transfer of audio files to the audio storage server 338, the event handler module 334 may actuate a proxy file creation application 236 that identifies new files in the audio storage server 338. If multiple audio files are determined to be related to each other, e.g., audio files constituting portions of a dub activity from the same actor (user device), the proxy file creation application 336 may combine the related files into a single audio file reflective of the entire dub activity. The proxy file creation application 336 may further create a proxy file of each dub activity in the form of a compressed audio file that can easily and quickly be streamed to each user device 308, 310 participating in the recording session for local playback. For the purposes of conducting the master recording session, the full, high-resolution audio file is not needed by any of the participants. The lower-quality, smaller file size audio files are adequate for review by actors and directors and for initial editing by the audio engineer. Such smaller file sizes can also be stored in a browser session cache in local memory by each user device 308, 310 and be available for playback and editing throughout the master recording session. Once a proxy audio file is created by the proxy file creation application 336, the event handler module 334 may alert the appropriate master session state 322a/b/c that the proxy audio file is complete and available. The applicable master session state 322a/b/c may then alert each user device of the availability of the proxy audio file on the audio storage server 338 and provide a uniform resource identifier for each user device 308, 310 to download the proxy audio file from the audio storage server 338 via the Web API 330.

The server computer 300 may further be configured with an event handler module 334. As with other components of the server computer 300, the event handler module 334 may be on a common device with other server components or it may be geographically distant, for example, as part of a CDN. The event handler module 334 may be configured to manage asynchronous processes related to a master recording session. For example, the event handler module 334 may receive notice from the proxy file creation application that an audio file has been downloaded to the audio storage server 338. Alternatively or additionally, the event handler module 334 may monitor the state information for each master recording session state 322a/b/n in the session environment 320 for indication of completion of a high-resolution audio recording or other event related to a task that it is configured to manage.

Figure 4:
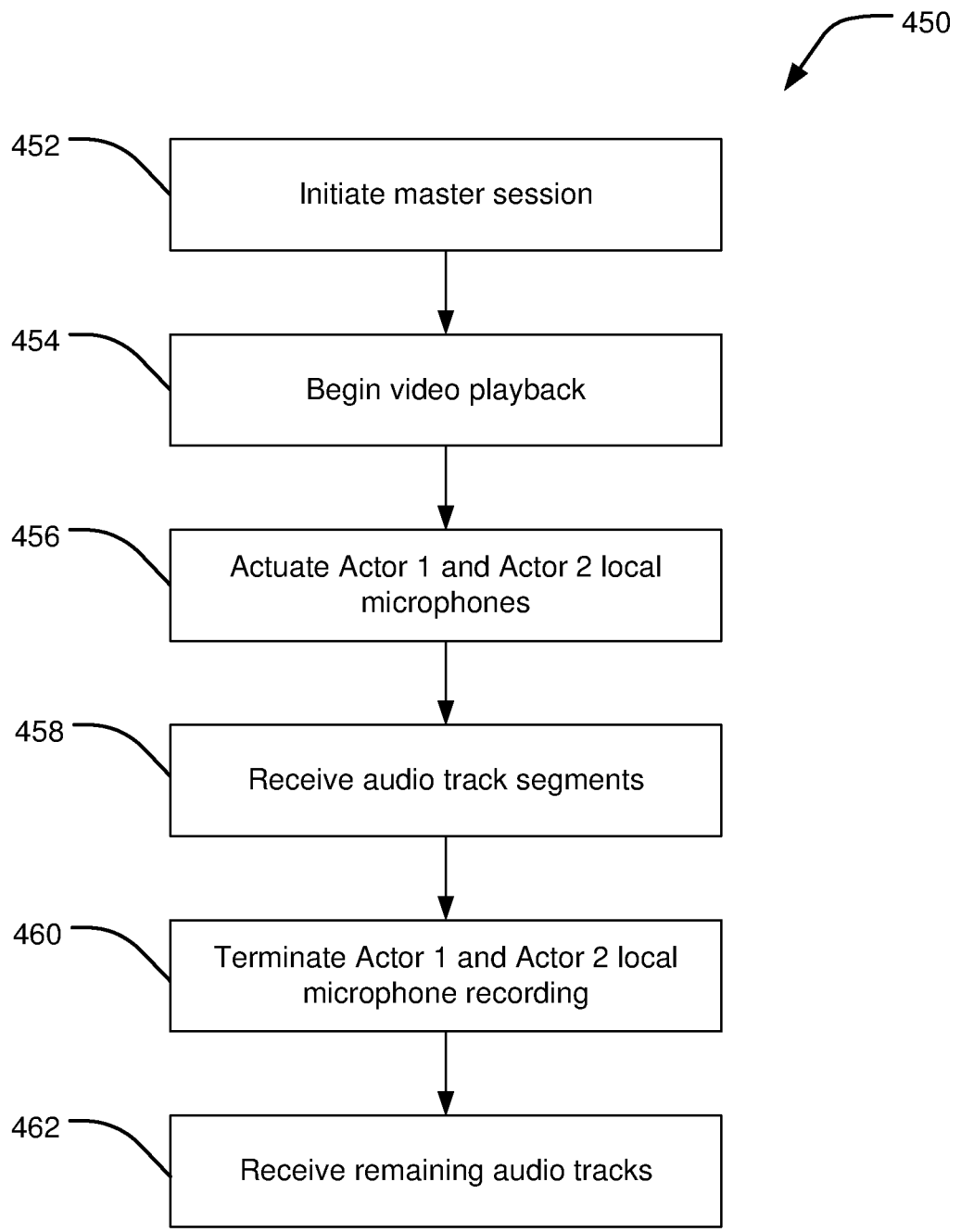
FIG. 4 is a flow chart of a method for capturing audio from multiple user devices for a video content using the system of FIG. 1.

FIG. 4 illustrates a flow chart for a method 450 to capture audio from multiple actors at discrete or separate locations. The method 450 may begin at operation 452 and the master recording session may be initiated. For example, the controller 108 may instruct the server 102 to open a virtual room hosted on an application on the server 102. The master recording session may then be accessible to the controller 108 and the other user devices 110-116 via a web browser. For example, the user devices 110-116 can navigate to the particular virtual room on the server 102 by inputting the URL into the browser. In other examples, the master recording session may be accessed by an application stored on the user devices 110, 112, 114, 116, which may then communicate with the server 102 to receive information. In some embodiments, access to the virtual room hosting the master recording session may be controlled, such that the users are required to input access credentials, e.g., login information, such as a username and password, which are then analyzed by the server 102 to determine whether the user is authorized to access the master recording session.

Once the user devices 110-116 are granted access to the master recording session, the user interface 204 may be displayed on the respective displays of the user devices 110-116. As described with respect to FIG. 2, the user interface 204 may include a video content 206 area that allows the user to view the video content.

With reference to FIG. 4, in operation 454, the controller 108 may initiate playback of the video content within the master recording session. For example, the user of the controller 108 may press a "play" button the user interface 204, which may then transmit a command to the server 102 hosting the master recording session. The play command causes the server 102 to access the video content, such as stored at the video content database on the storage 106, and begin playback. The video content is then streamed from the storage 106 to the user devices 110, 112, 114, 116 (e.g., the browser on the user devices) to display the video content as it is played. Importantly, the video content does not need to be downloaded as an entire package and stored; rather it can be streamed, e.g., segments or fragments may be downloaded to the local user devices 110, 112, 114, 116 during streaming, but the segments or fragments are discarded after being displayed. In this manner, the video content, which may include unreleased television or movie content, is not accessible to the users outside of the master recording session, helping prevent theft and leaks of the content.

As the video content is being played or otherwise presented, the method 450 proceeds to operation 456 and the controller 108 actuates the microphones on the user devices 110, 112, 114. For example, the sound engineer or other user for the controller 108 may select the recording button on the user interface 204, causing the server 102 to issue a command to the user devices 110, 112, 114 selected for recording. In one embodiment, there may be two or more user devices 110, 112, 114 that are selected for recording and in this embodiment, the first user device 110 and the second user device 112 may have their microphones or other audio sensors activated or enabled for recording. The actors or other users for the activated user devices 110, 112 may then generate the audio content or contribution, e.g., speak dialogue. The audio content may be dependent on the video timing and the actors may alternate between speaking and/or may speak at the same time over one another.

As the audio is captured by the user devices 110, 112 (e.g., the microphones), the audio may be stored on memory on the user devices 110, 112. The audio content may include time stamp information corresponding to an activation time, e.g., a time in which the recording was started or activated by the controller 108. The time stamp may correspond to the video content timeline, rather than a local time for the audio recording for the respective user device. In this manner, the audio content can be synchronized back to the video content, without requiring the user to have recorded at exactly the same time as the video was played on the other user devices and/or controller 108.

In one embodiment, the audio content is stored on the local memory, e.g., random access memory (RAM) on the user devices. The audio may optionally be encrypted while stored, to prevent the user or others from accesses the content while on the local device.

In operation 458, the audio content or audio clips may be received from the selected user devices 110, 112. For example, the selected user devices 110, 112 may transmit the audio content in segments or fragments to the storage device 106 and/or server 102. In some embodiments, the audio segments may be deleted from the local storage on the user device 110, 112 as the segments are received at the storage device 106. In one embodiment, the audio segments are transmitted at predetermined increments, e.g., every 5 mb, to allow continuous transfer during the master recording session to reduce a transfer delay that may occur if sent as a single large file after the recording is complete. Utilizing predetermined increments, such as 5 mb segments, the transfer process between the user device and the storage for any given segment is quick and does not monopolize the bandwidth for the network, allowing the playback of the video content in the master recording session to not be noticeably impacted.

In operation 460, the controller 108 may terminate the recording for the selected recording user devices 110, 112. For example, the controller 108 may select the recording button the user interface 204 and issue stop commands to the user devices 110, 112. The stop command may deactivate the microphone or other audio sensor on the user devices 110, 112. In some embodiments, the stop command may provide and additional time stamp and/or other metadata that may be stored with the audio content that indicates the time in which the In operation 462, the remaining audio segments from the audio content may be received by the storage device 106 and/or server 102. For example, the selected user devices 110, 112 may transfer any remaining segments from the user devices 110, 112 to the storage 106. In some embodiments, if a user attempts to close the browser window accessing the master recording session, an alert or other notification (e.g., sound, pop window, etc.) may be presented that indicates remaining audio segments need to be transferred. This may be useful to help prevent inadvertent destruction of audio segments that are stored locally on a user device but that have not yet been transferred to the server 102 or storage device 106. For example, in some instances the system may be configured such that when the browser window closes any remain segments may be deleted to prevent unauthorized access.

Figure 5:
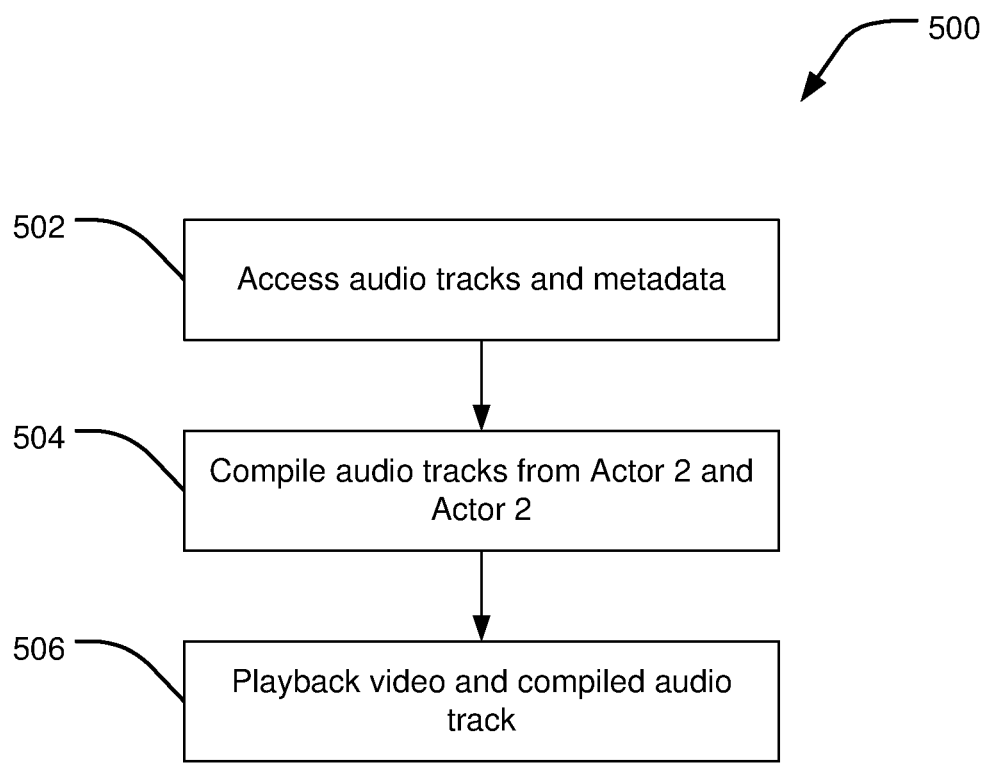
FIG. 5 is a method of generating content including both video content and audio content captured from multiple user devices.

With reference to FIG. 5, with the received audio content and corresponding data, the system may utilize the audio content to generate a compilation. For example, the method 500 may include operation 502 and the server 102 accesses the audio clips for the first user and the second user (e.g., actor 1 and actor 2) from the storage 106. The audio clips or audio content may be stored with the metadata, including time stamp information in the storage 106. In many embodiments, the audio clips may be the original content as received directly from the user devices 110, 112 and may include a high-quality audio, e.g., 24-bit 48 kHz.

In operation 504, the server 102 may compile the audio clips from the first user device 110 and the second user device 112 with the video content. For example, the server 102 may utilize the metadata to synchronize both tracks to the video content, such that the start and stop times for the audio clips are linked to points in time in the video file, this may be a time stamp and/or frame identification. In some embodiments, the audio content may be edited after recordation. The edit information may also be stored in the storage 106 (either separate from or with the audio content). The edit information may include, e.g., trim, fade, loudness, and other features that may have been modified by the editor with respect to the original audio content. In one embodiment, the audio content and the edit information may be exportable, e.g., downloadable or accessed, by other software programs, such as editing programs, that may be separate from the master recording session.

In operation 506, the controller 108 may select playback of the compilation of the video and audio content. For example, the controller 108 may replay the video content and play the audio clips as synchronized to the video content. In some embodiments, the playback of the audio content may also include application of any edits or the like made to the audio clips after receipt from the recording user devices. In some embodiments, the playback during the master recording session may not utilize the original audio content as stored on the storage 106. Rather, playback during the master recording session may utilize a proxy that may be generated based on the audio content. The proxy may have a lower quality and thus a reduced size, reducing the bandwidth required for playback of the compilation.

The system and methods presented herein allow audio recording and synchronization to video content across multiple locations, without having to sacrifice for a reduction in quality for the captured audio content. Additionally, as the content assets (e.g., audio and video) playback may be streamed within a browser environment, users do not need to install applications and/or retain local copies of the content, reducing risks of unauthorized leaks of content and maintaining version control. Additionally, users can contribute simultaneously to the content and collaborate within the master recording session without lagging or other synchronization issues for the audio content. Further, because the audio content may be streamed to the storage after capture, the audio can be reviewed and play backed in the same master session immediately after it has been recorded. The browser accessibility helps the prevent the need for actors and other voice artists to have to go the same physical location (e.g., recording studio) to still be able to record scenes or other content with others. Conventional systems may record multiple actors at a time, but often generate a single audio file with each actor's voice captured together. This prevents editing of one actor's voice without impacting the others. Further, if there is background noise in one of the actor's recordation, it will taint the entire audio content. Whereas the systems and methods here, allow the audio content from multiple actors to be edited separately and combined together, such that interference or noise on one audio clip will not impact the others. Further, as all of the audio clips captured including synchronization data to the same video content, the audio can be mapped to the video content easily, without having to map each audio file one by one, i.e., they are automatically mapped via the metadata.

An exemplary computer system 600 for implementing the synchronous recording processes above is depicted in FIG. 6. The computer system of a sender or a recipient (e.g., an engineer, editor, actor, director, etc.) may be a personal computer (PC), a workstation, a notebook or portable computer, a tablet PC, or other device, with internal processing and memory components as well as interface components for connection with external input, output, storage, network, and other types of peripheral devices. The server computer system may be one or more computer devices providing web services, database services, file storage and access services, and application services among others. Internal components of the computer system in FIG. 6 are shown within the dashed line and external components are shown outside of the dashed line. Components that may be internal or external are shown straddling the dashed line.

Any computer system 600, regardless of whether configured as a personal computer system for a user, or as a computer server, includes a processor 602 and a system memory 606 connected by a system bus 604 that also operatively couples various system components. There may be one or more processors 602, e.g., a single central processing unit (CPU), or a plurality of processing units, commonly referred to as a parallel processing environment (for example, a dual-core, quad-core, or other multi-core processing device). The system bus 604 may be any of several types of bus structures including a memory bus or memory controller, a peripheral bus, a switched-fabric, point-to-point connection, and a local bus using any of a variety of bus architectures. The system memory 606 includes read only memory (ROM) 608 and random access memory (RAM) 610. A basic input/output system (BIOS) 612, containing the basic routines that help to transfer information between elements within the computer system 600, such as during start-up, is stored in ROM 608. A cache 614 may be set aside in RAM 610 to provide a high speed memory store for frequently accessed data.

A local internal storage interface 616 may be connected with the system bus 604 to provide read and write access to a data storage device 618 directly connected to the computer system 600, e.g., for nonvolatile storage of applications, files, and data. The data storage device 630 may be a solid-state memory device, a magnetic disk drive, an optical disc drive, a flash drive, or other storage medium. A number of program modules and other data may be stored on the data storage device 618, including an operating system 620, one or more application programs 622, and data files 624. Note that the data storage device 618 may be either an internal component or an external component of the computer system 600 as indicated by the data storage device 618 straddling the dashed line in FIG. 6. In some configurations, there may be both an internal and an external data storage device 618.

The computer system 600 may further include an external data storage device 630. The data storage device 630 may be a solid-state memory device, a magnetic disk drive, an optical disc drive, a flash drive, or other storage medium. The external storage device 630 may be connected with the system bus 604 via an external storage interface 628 to provide read and write access to the external storage device 630 initiated by other components or applications within the computer system 600. The external storage device 630 (and any associated computer-readable media) may be used to provide nonvolatile storage of computer-readable instructions, data structures, program modules, and other data for the computer system 600. Alternatively, the computer system 600 may access remote storage devices (e.g., "cloud" storage) over a communication network (e.g., the Internet) as further described below.

A display device 634, e.g., a monitor, a television, or a projector, or other type of presentation device may also be connected to the system bus 604 via an interface, such as a video adapter 640 or video card. In addition to the monitor 642, the computer system 600 may include other peripheral input and output devices, which are often connected to the processor 602 and memory 606 through the serial port interface 644 that is coupled to the system bus 606. Input and output devices may also or alternately be connected with the system bus 604 by other interfaces, for example, a universal serial bus (USB A/B/C), an IEEE 1394 interface ("Firewire"), a Lightning port, a parallel port, or a game port, or wirelessly via Bluetooth protocol. A user may enter commands and information into the computer system 600 through various input devices including, for example, a keyboard 642 and pointing device 644, for example, a mouse. Other input devices (not shown) may include, for example, a joystick, a game pad, a tablet, a touch screen device, a scanner, a facsimile machine, a microphone, a digital camera, and a digital video camera. Additionally, audio and video devices such as a microphone 646, a video camera 648 (e.g., a webcam), and external speakers 650, may be connected to the system bus 604 through the serial port interface 640 with or without intervening specialized audio or video cards card or other media interfaces (not shown).

The computer system 600 may operate in a networked environment using logical connections through a network interface 652 coupled with the system bus 604 to communicate with one or more remote devices. The logical connections depicted in FIG. 6 include a local-area network (LAN) 654 and a wide-area network (WAN) 660. Such networking environments are commonplace in home networks, office networks, enterprise-wide computer networks, and intranets. These logical connections may be achieved by a communication device coupled to or integral with the computer system 600. As depicted in FIG. 6, the LAN 654 may use a router 656 or hub, either wired or wireless, e.g., via IEEE 802.11 protocols, internal or external, to connect with remote devices, e.g., a remote computer 658, similarly connected on the LAN 654. The remote computer 658 may be another personal computer, a server, a client, a peer device, or other common network node, and typically includes many or all of the elements described above relative to the computer system 600.

To connect with a WAN 660, the computer system 600 typically includes a modem 662 for establishing communications over the WAN 660. Typically the WAN 660 may be the Internet. However, in some instances the WAN 660 may be a large private network spread among multiple locations, or a virtual private network (VPN). The modem 662 may be a telephone modem, a high-speed modem (e.g., a digital subscriber line (DSL) modem), a cable modem, or similar type of communications device. The modem 662, which may be internal or external, is connected to the system bus 618 via the network interface 652. In alternate embodiments the modem 662 may be connected via the serial port interface 644. It should be appreciated that the network connections shown are exemplary and other means of and communications devices for establishing a network communications link between the computer system and other devices or networks may be used.

The technology described herein may be implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, other embodiments using different combinations of elements and structures disclosed herein are contemplated, as other iterations can be determined through ordinary skill based upon the teachings of the present disclosure. It is intended that all matter contained in the above description and shown in the accompanying drawings shall be interpreted as illustrative only of particular embodiments and not limiting. Changes in detail or structure may be made without departing from the basic elements of the invention as defined in the following claims.

What is claimed is:

1. A method comprising:
providing access to a master recording session to a first device corresponding to a first user and a second device corresponding to a second user, wherein the first device and the second device are in different physical locations;
initiating a playback of a pre-recorded video content at the first device and at the second device;
actuating a first microphone coupled to the first device to record a first audio clip, wherein the actuation is synchronized to a first playback location within the pre-recorded video content based on a first plurality of timestamps corresponding to the pre-recorded video content;
actuating a second microphone coupled to the second device to record a second audio clip, wherein the actuation is synchronized to a second playback location within the pre-recorded video content based on a second plurality of timestamps corresponding to the pre-recorded video content, wherein the actuation of the first microphone and the actuation of the second microphone allow for the capture of the first audio clip and the capture of the second audio clip at substantially the same time;
receiving the first audio clip from the first device and the second audio clip from the second device; and
generating a compilation audio clip including audio from the first audio clip and audio from the second audio clip, wherein the compilation audio clip is synchronized to the pre-recorded video content, wherein generating the compilation audio clip comprises synchronizing the audio from the first audio clip to at least one frame of the pre-recorded video content using the first plurality of timestamps and synchronizing the audio from the second audio clip to the at least one frame of the pre-recorded video content using the second plurality of timestamps.

2. The method of claim 1, wherein the playback of the pre-recorded video content occurs at the first device at a first time and the playback of the pre-recorded video content occurs at the second device at a second time.

3. The method of claim 1, wherein the playback of the pre-recorded video content occurs at the first device and at the second device at substantially the same time.

4. The method of claim 1, wherein the first audio clip is stored with first edit metadata in a first location in a database and the second audio clip is stored with second edit metadata in a second location in the database, wherein the compilation audio clip is generated by accessing the first audio clip from the first location, the second audio clip from the second location, and applying the first edit metadata and the second edit metadata to the first audio clip and the second audio clip, respectively.

5. The method of claim 1, further comprising:
streaming a playback of the pre-recorded video content with the synchronized compilation audio clip to the first user device and the second user device.

6. The method of claim 1, wherein the first audio clip is received in a plurality of segments from the first device, wherein a first of the plurality of segments is received while the first microphone is actuated.

7. The method of claim 1, wherein the first audio clip is stored locally on the first device and the second audio clip is stored locally on the second device.

8. The method of claim 7, further comprising terminating the master recording session, wherein upon termination, the first audio clip is deleted from the first device and the second audio clip is deleted from the second device.

9. The method of claim 1, further comprising providing access to an audible playback session at the same time as the master recording session, wherein the audible playback session provides audio corresponding to the first audio clip and the second audio clip during capture of the first audio clip by the first microphone and capture of the second audio clip by the second microphone.

10. The method of claim 1, wherein the initiating of the playback of the pre-recorded video content comprises transmitting a first playback command from a server to the first device and a second playback command from the server to the second device.

11. The method of claim 10, further comprising deactivating the first microphone and the second microphone to cease recording of the first audio clip and the second audio clip, respectively.

12. The method of claim 1, further comprising:
receiving a first edit metadata corresponding to the first audio clip and the video clip playback from the first device; and
receiving a second edit metadata corresponding to the second audio clip and the pre-recorded video content playback from the second device, wherein the first edit metadata and the second edit metadata are used to synchronize the first audio clip and the second audio clip to the pre-recorded video content.

13. The method of claim 1, wherein providing access to the master recording session further comprises providing access to a third device corresponding to a third user, wherein the first device, the second device, and the third device are in different physical locations.

14. The method of claim 13, wherein the playback of the pre-recorded video content to the first and second device is initiated responsive to a command from the third device.

15. The method of claim 13, further comprising receiving, from the third device, a first command for the actuation of a first microphone coupled to the first device.

16. The method of claim 13, further comprising receiving, from the third device, a first command for the actuation of the second microphone coupled to the second device.

17. A system comprising:
a database for storing audio clips; and
a processing element associated with the database configured to:
transmit a pre-recorded video content to a first user device and a second user device;
initiate a first local audio recording at the first user device and a second local audio recording at the second user device based on the transmission of the pre-recorded video content to the first user device and the second user device, wherein the initiation of the first local audio recording is synchronized to a first playback location within playback of the pre-recorded video content at the first user device based on a first plurality of timestamps corresponding to the pre-recorded video content, wherein the initiation of the second local audio recording is synchronized to a second playback location within playback of the pre-recorded video content at the second user device based on a second plurality of timestamps corresponding to the pre-recorded video content, wherein the actuation of the first microphone and the actuation of the second microphone allow for the capture of the first audio clip and the capture of the second audio clip at substantially the same time;
terminate the first local audio recording and the second local audio recording;
receive the first local audio recording from the first user device and the second local audio recording from the second user device;
store the first local audio recording at a first location within the database and the second local audio recording at a second location within the database; and
generate a compilation audio clip including audio from the first local audio recording and audio from the second local audio recording, wherein the compilation audio clip is synchronized to the pre-recorded video content, wherein generating the compilation audio clip comprises synchronizing the audio from the first audio clip to at least one frame of the pre-recorded video content using the first plurality of timestamps and synchronizing the audio from the second audio clip to the at least one frame of the pre-recorded video content using the second plurality of timestamps.

18. The system of claim 17, wherein the first plurality of timestamps comprises a time start based on the initiation of the first local audio recording.

19. The system of claim 17, wherein the processing element is further configured to playback the compilation audio clip by accessing the first local audio recording and the second local audio recording.

20. The system of claim 17, wherein the processing element is further configured to stream the playback of the compilation audio clip and the pre-recorded video content to the first user device and the second user device.

21. The system of claim 17, wherein the processing element initiates the first local audio recording and the second local audio recording by transmitting a command to actuate a microphone at both the first user device and the second user device.

* * * * *